(12) United States Patent
Ulrey et al.

(10) Patent No.: US 10,302,195 B2
(45) Date of Patent: May 28, 2019

(54) VEHICLE ROLL-AWAY PREVENTION

(71) Applicant: Ford Global Technologies, LLC, Dearborn, MI (US)

(72) Inventors: Joseph Norman Ulrey, Dearborn, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 330 days.

(21) Appl. No.: 15/348,161

(22) Filed: Nov. 10, 2016

(65) Prior Publication Data
US 2018/0128371 A1     May 10, 2018

(51) Int. Cl.
| F16H 63/48 | (2006.01) |
| F16H 61/22 | (2006.01) |
| F16H 59/66 | (2006.01) |
| F16H 59/74 | (2006.01) |

(52) U.S. Cl.
CPC .......... F16H 63/483 (2013.01); F16H 61/22 (2013.01); *F16H 2059/663* (2013.01); *F16H 2059/746* (2013.01); *F16H 2061/223* (2013.01); *F16H 2312/022* (2013.01)

(58) Field of Classification Search
CPC .... F16H 61/22; F16H 2061/223; F16H 63/48; F16H 63/483
See application file for complete search history.

(56) References Cited

U.S. PATENT DOCUMENTS

| 5,251,723 A | * | 10/1993 | Rolinski | ............... B60T 11/105 |
| | | | | 192/220.4 |
| 5,919,112 A | | 7/1999 | Michael et al. | |
| 2008/0035444 A1 | * | 2/2008 | Schiele | ............... F16H 61/0059 |
| | | | | 192/219.5 |
| 2010/0101353 A1 | * | 4/2010 | Giefer | ..................... F16H 61/22 |
| | | | | 74/473.18 |
| 2012/0232765 A1 | | 9/2012 | Holub et al. | |

FOREIGN PATENT DOCUMENTS

GB        2441337 B        3/2008

* cited by examiner

*Primary Examiner* — Edwin A Young
(74) *Attorney, Agent, or Firm* — Brooks Kushman P.C.

(57) ABSTRACT

A brake interlock feature prevents release of the park mechanism unless a driver is depressing the brake pedal. This is intended to prevent the vehicle from rolling following park release. An enhanced brake interlock feature also checks to ensure that adequate brake boost is available to prevent vehicle roll before releasing the park mechanism. The feature may directly measure brake boost or may measure a quantity indirectly related to the availability of brake boost such as engine speed.

13 Claims, 6 Drawing Sheets

VEHICLE ROLL-AWAY PREVENTION

TECHNICAL FIELD

This disclosure relates to the field of vehicle safety features. More particularly, the disclosure pertains to a feature to prevent a vehicle from rolling downhill following a shift out of park.

BACKGROUND

FIG. 1 schematically illustrates a rear wheel drive vehicle powertrain and driver interface. Bold solid lines represent mechanical power flow connections such as shafts. Dashed lines represent the flow of information signals. For clarity, power flow paths and signals not impacted by the present invention may be omitted from FIG. 1. Engine 10 generates power by burning fuel. Starter 12 uses electrical energy from a battery to accelerate the engine to a speed at which the combustion process can be sustained. Transmission 14 establishes a variety of power flow paths with various speed and torque ratios between the engine crankshaft and a transmission output shaft to adapt the power to current vehicle needs. Specifically, transmission 14 is an automatic transmission in which a controller manages the engagement and disengagement of clutches and/or other measures to switch among available power flow paths and to adjust the transmission ratio. Differential 16 splits the power from the transmission output shaft between left and right rear wheels 18 and 20, permitting slight speed differences such as when the vehicle turns a corner. Front wheels 22 and 24 are not powered. A four wheel drive powertrain may include a transfer case which diverts some or all power from the transmission output shaft to the front wheels. A front wheel drive powertrain drives the front wheels as opposed to the rear wheels. In a front wheel drive powertrain, the transmission and differential may be combined into a single housing.

Brakes 26, 28, 30, and 32 selectively restrain wheels 18, 20, 22, and 24 respectively. Typically, the brakes are engaged in response to a driver depressing brake pedal 34. The torque capacity of the brakes varies in response to the degree of pedal depression and/or the force exerted on pedal 34. In some circumstances, some drivers may not be comfortable while pressing brake pedal 34 hard enough to slow the vehicle or to hold the vehicle stationary on an incline. To assist the driver, the braking system includes an engine driven brake boost 36. When the brake boost is available, the ratio of brake torque capacity to pedal force is increased.

Transmission 14 includes a park mechanism. A park mechanism is a mechanism designed to hold the vehicle stationary for an indefinite period without consuming any power. Typically, the park mechanism includes a park pawl which engages a park gear on the transmission output shaft. The park pawl is generally not designed to engage the park gear when the vehicle is moving at a speed higher than a relatively low threshold speed. The park mechanism may include features to delay engagement if the mechanism is triggered at a speed higher than the threshold speed.

A driver controls the operation of the powertrain by interacting with various controls. As discussed below, the driver controls the starting and stopping of the engine by manipulating ignition controls including keyfob sensor 38 and start/stop button 40. Keyfob sensor 38 determines whether an electronic keyfob is present within the vehicle, such as in a driver's pocket or purse. The driver selects the desired transmission range using a range selector 42. Range selector 42 may include buttons for various transmission modes such as buttons 44, 46, 48, and 50. Once a drive range is selected, the driver controls the wheel torque using accelerator pedal 52 (for positive torque) and brake pedal 34 (for negative torque). Controller 54 sends signals to control various powertrain components based on driver manipulation of the controls listed above and on other sensors. These other sensors may include a grade sensor 56 to detect the current incline (uphill or downhill) of the road. Display 57 is used to display messages to the driver. To avoid accidental release of the Park mechanism, the controller may not respond release the Park mechanism unless brake pedal 34 is depressed.

SUMMARY OF THE DISCLOSURE

A vehicle includes a transmission, a transmission mode selector, an engine, and a controller. The transmission includes a park mechanism. The transmission mode selector accepts user requests to release or engage the park mechanism. The mode selector may be, as examples, a set of buttons or a shift lever. The engine provides brake force assistance by creation of vacuum (or via a hydraulic pump in some cases). The controller is programmed to inhibit release of the park mechanism in response to a level of brake force assistance being less than a threshold. For example, the controller may inhibit release of the park mechanism in response to an ignition state indicating that the engine is not running. The threshold may vary depending on road grade. The controller may inhibit release of the park mechanism by engaging the shift lock. The vehicle may include a shift lock override control and the controller may be programmed to release the park mechanism in response to selection of Neutral via the mode selector while the shift lock override control is activated regardless of the level of brake force assistance. Upon inhibiting release of the park mechanism, the controller may display a message to the driver.

According to a first embodiment, a transmission control method includes releasing a park mechanism in response to a user request if an engine is running and a brake pedal is pressed and preventing release of the park mechanism in response to the engine being stopped. The method may further include releasing the park mechanism in response to the user request if the engine is stopped, the brake pedal is pressed and a grade is less than a threshold. The method may further include releasing the park mechanism in response to the user request if the engine is stopped, the brake pedal is pressed and a shift lock override control is activated. The method may further include displaying a message to a driver in response to an attempt to disengage the park mechanism with the engine stopped.

According to a second embodiment, a transmission control method includes measuring a quantity indicative of available brake boost and preventing release of a park mechanism in response to the quantity being less than a threshold. The quantity may be, for example, engine speed. The threshold may vary based on grade. Release of the park mechanism may be prevented by engaging a shift lock.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
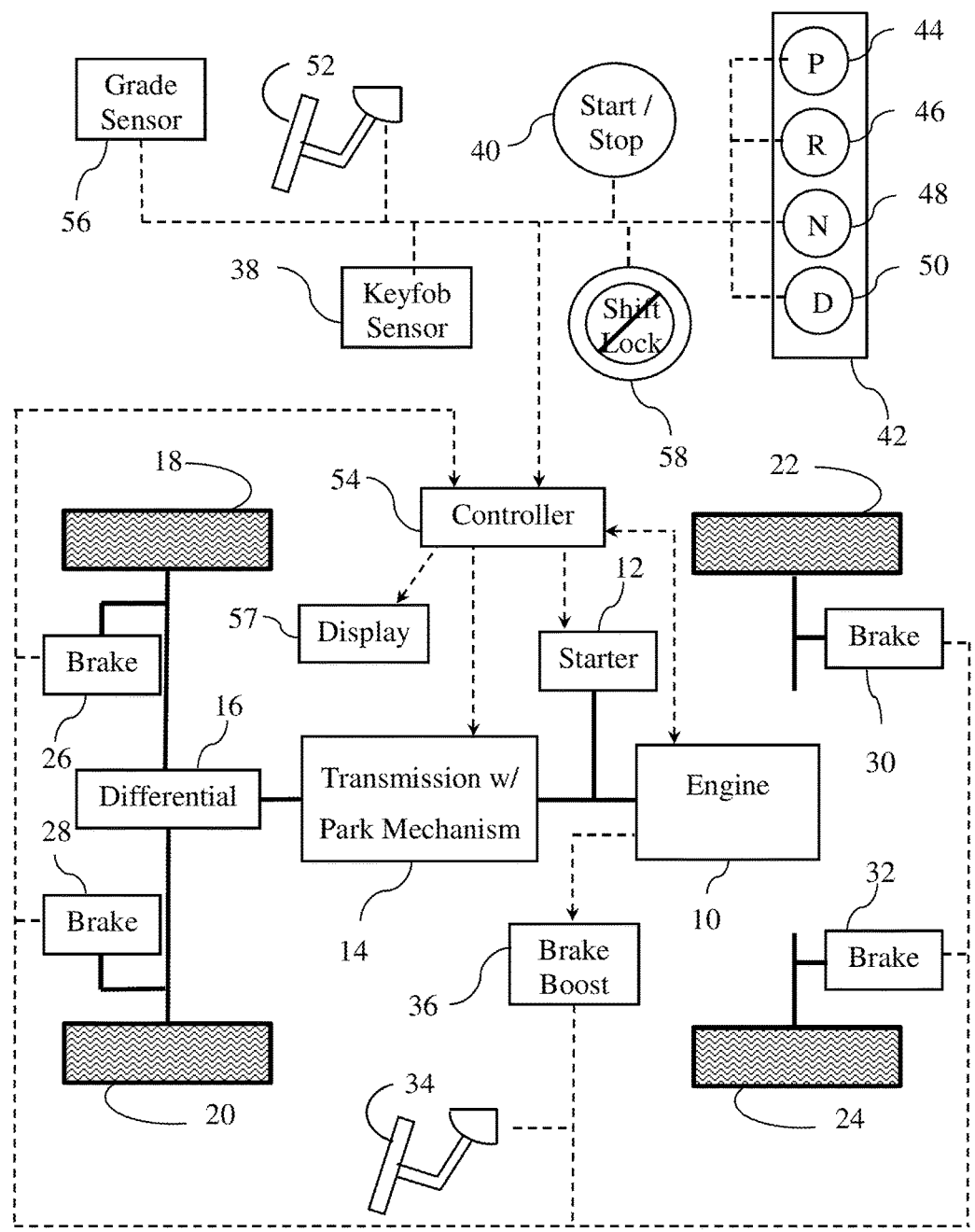
FIG. 1 is a schematic illustration of a first vehicle powertrain and user interface.

It is not uncommon for an individual to drive different vehicles on different occasions. These vehicles may have different driver interfaces for starting the engine and for shifting into and out of park. Some vehicles, such as hybrid electric vehicles, may not start the engine when the driver pushes start/stop button 40. Consequently, a driver may believe that they are ready to drive away when, in fact, the engine is not running. If the driver disengages park in this situation, brake boost may not be available to hold the vehicle stationary with a comfortable level of foot pedal force. On a sufficiently steep hill and without brake boost, the driver may not be able to press brake pedal 34 hard enough to prevent rolling. The inventors propose to enhance the brake interlock feature such that, even though the brake pedal is depressed, controller 54 will check for adequate brake boost before shifting out of park. For a vehicle with engine driven brake boost, such as illustrated in FIG. 1, the controller may infer the level of brake boost available based on whether or not the engine is running. In some vehicles, such as hybrid electric vehicles, brake boost may be powered differently and other methods would be appropriate. Shift lock over-ride button 58 is provided to inhibit this feature, such as when the engine will not start and the operator desires to shift into neutral for towing.

Figure 2:
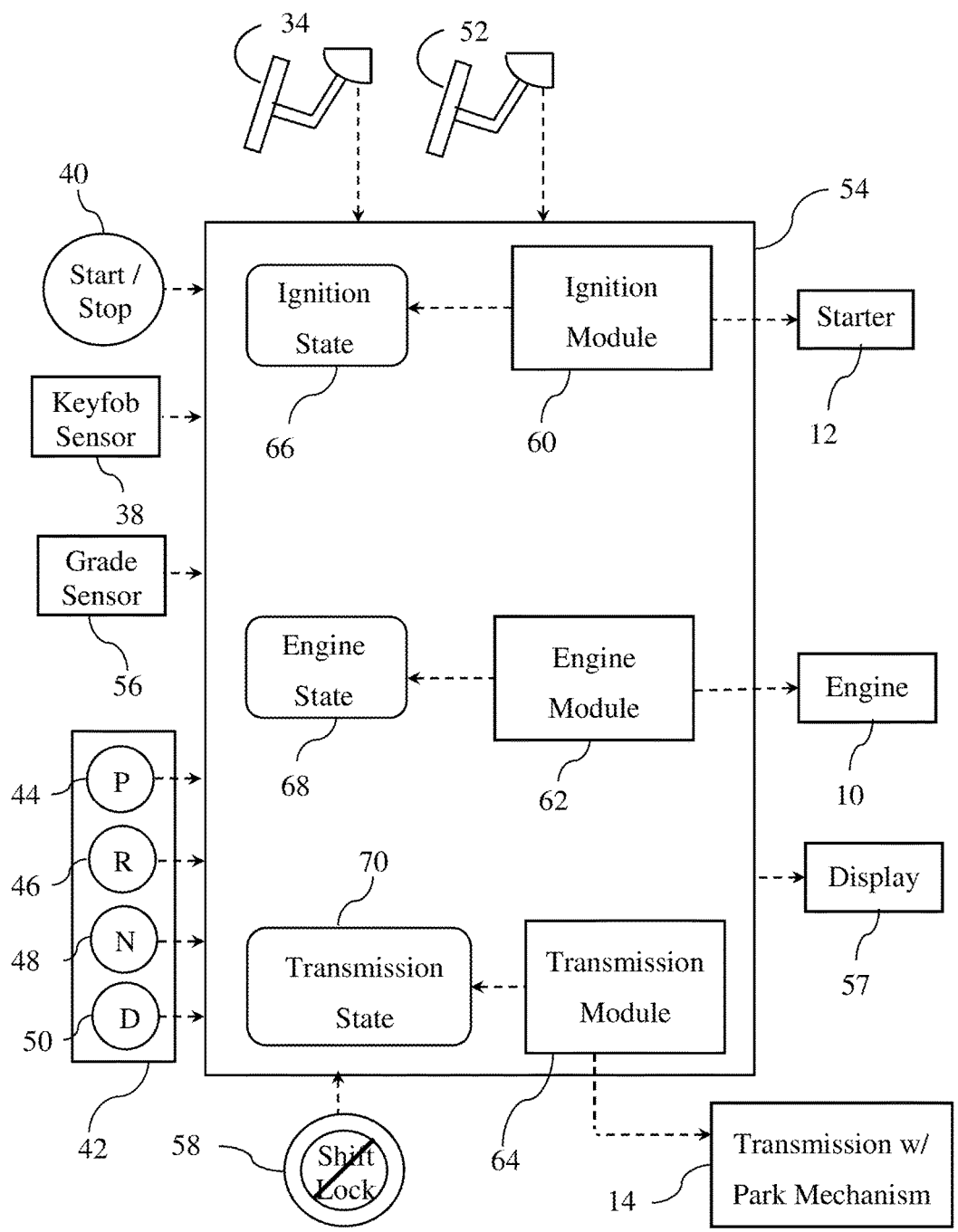
FIG. 2 is a schematic illustration of a logical structure of a controller suitable for use in the vehicle powertrain and user interface of FIG. 1.

FIG. 2 schematically illustrates a logical structure for controller 54 of FIG. 1. The controller includes three different control modules: ignition module 60, engine module 62, and transmission module 64. The control modules may be implemented in a variety of ways, including multiple processors, a single processor executing separate control threads, or a single processor executing a single control thread. Each module has access to each of the sensor signals, although each module may only utilize a fraction of these signals. The modules also produce state information which is available to the other modules.

Ignition module 60 controls operation of starter 12. Ignition module 60 also sets ignition state 66 to one of ignition on, ignition off, and accessory. An embodiment of such an ignition module may utilize signals from Start/Stop button 40, keyfob sensor 38, and brake pedal 34. Engine module 64 controls operation of engine 10 and sets engine state 68. Transmission module 64 controls operation of transmission 14 and sets transmission state 70. The set of transmission states include park, neutral, reverse, and forward. Alternatively, the transmission state may indicate which forward gear ratio ($1^{st}$, $2^{nd}$, $3^{rd}$, etc.) is presently engaged instead of simply indicating forward. An embodiment of such a transmission module may utilize signals from range selector 42, brake pedal 34, and accelerator pedal 48. For example, transmission module 64 may issue commands to engage particular clutches to establish a reverse gear ratio in response to depression of R button 46. Transmission controller 64 may engage the parking pawl of the transmission in response to depression of P button 44 and may disengage the pawl in response to depression of any of the other three buttons.

Figure 3:
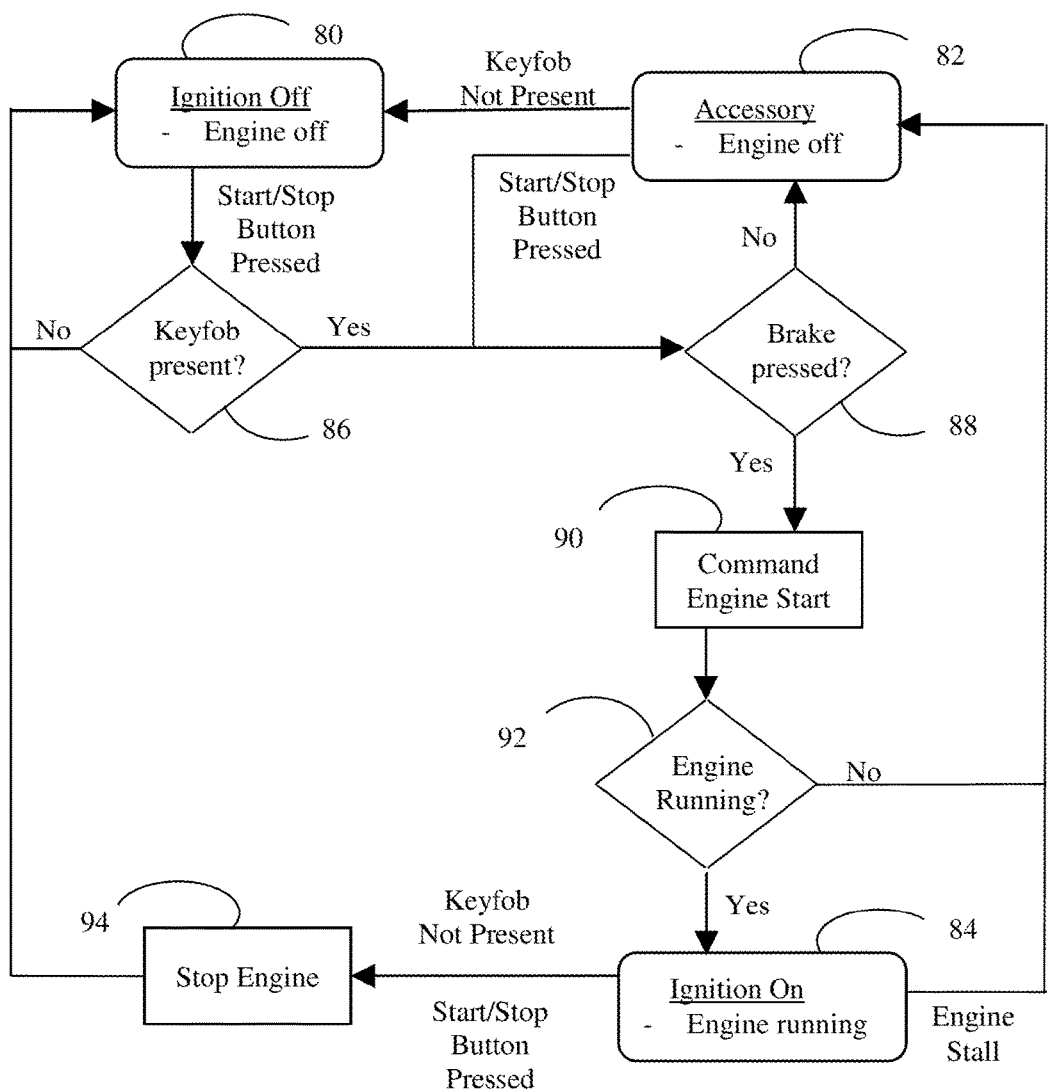
FIG. 3 is a flow chart illustrating operation of the ignition module of the controller of FIG. 2.

FIG. 3 illustrates exemplary control logic for ignition module 60. The three ignition states ignition off, accessory, and ignition on are illustrated by rounded corner boxes 80, 82, and 84. Outgoing arrows from these rounded corner boxes indicates events that may cause the controller to change state or take action while in the state. Actions are shown as square boxes. Decisions are shown as diamonds. In ignition off state 80, the controller reacts to start/stop button 40 being pressed by checking for the presence of a keyfob at 86. (In a car without and engine that runs continuously, "ignition on" is analogous to "ready to drive" state.) If no keyfob is present, the controller stays in ignition off state. If a keyfob is present, the controller checks whether brake pedal 34 is pressed at 88. If not, the controller transitions into accessory state 82. If the brake pedal is pressed, the controller commands starter 12 to start the engine at 90 and then checks at 92 whether the start was successful. If the start is not successful, the controller transitions to accessory state 82. If the start is successful, the controller transitions to ignition on state 84. When the controller is in accessory state 82, it reacts to indication that the keyfob is no longer present or that the start/stop button has been pressed. If the keyfob is not present, the controller transitions to ignition off state 80. If start/stop button 40 is pressed, the controller checks the status of brake pedal 34 at 88 and proceeds as previously described. When the controller is in ignition on state 84, it reacts to an engine stall by transitioning to accessory state 82. It reacts to either the start/stop button being pressed or the keyfob not being present by stopping the engine at 94 and then transitioning to ignition off state 80. This control logic ensures that the engine is off whenever the state is either ignition off 80 or accessory 82 and ensures that the engine is on whenever the state is ignition on 84.

Figure 4:
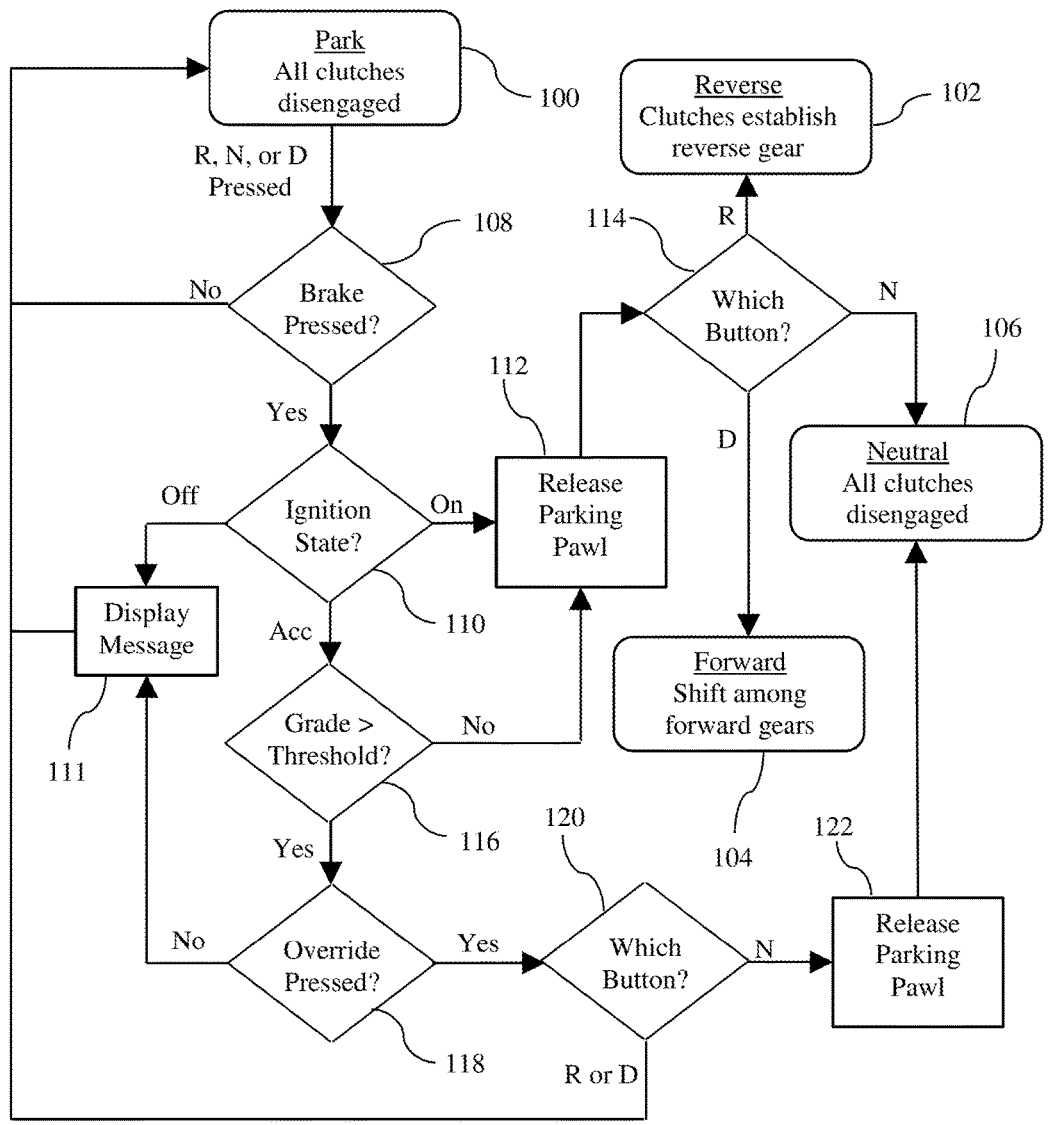
FIG. 4 is a flow chart illustrating operation of the transmission module of the controller of FIG. 2.

FIG. 4 illustrates exemplary control logic for transmission module 64. Four transmission states park, reverse, forward, and neutral are illustrated by rounded corner boxes 100, 102, 104, and 106. In park state 100, the controller reacts to activation of R button 46, N button 48, or D button 50. If brake pedal 34 is not pressed at 108, the controller remains in park state without taking any action. If the brake pedal is pressed at 108, the controller checks the current ignition state at 110. If the ignition state is off, the controller displays a message to the driver at 111 and remains in the park state. Since the engine is not running in ignition off state, brake boost is not available and the controller prevents release of the park mechanism. Since the driver may not realize that the engine was not running, the message informs the driver why the transmission remained in Park and instructs the driver to start the engine before shift out of Park. Alternatively, the controller could check the availability of brake boost in other ways, such as sensing boost pressure (pneumatic or hydraulic) in the brake system. If the ignition state is on, the controller concludes that brake boost is available and releases the parking pawl at 112. Then, the controller decides at 114 which state to enter based on which of the three buttons were pressed. If the ignition state is accessory at 110, the controller checks whether the road grade exceeds a threshold at 116. If not, the controller releases the parking pawl at 112 and proceeds to an appropriate state as previously described. The threshold is selected such that a driver would be capable of generating enough brake torque capacity without brake assist. The grade does exceed the threshold, the controller checks at 118 whether shift lock override button 58 is activated. If not, the controller displays a message to the driver and returns to park state 100 without releasing the parking pawl. If button 58 is activated, the behavior may depend on which mode button was pressed as determined at 120. If the neutral button was pressed, the parking pawl is released at 122 and the controller transitions into neutral state 106. Otherwise, the controller remains in park state 100 without releasing the parking pawl. In alternative embodiments, ignition off and accessory states may be handled the same as one another.

Figure 5:
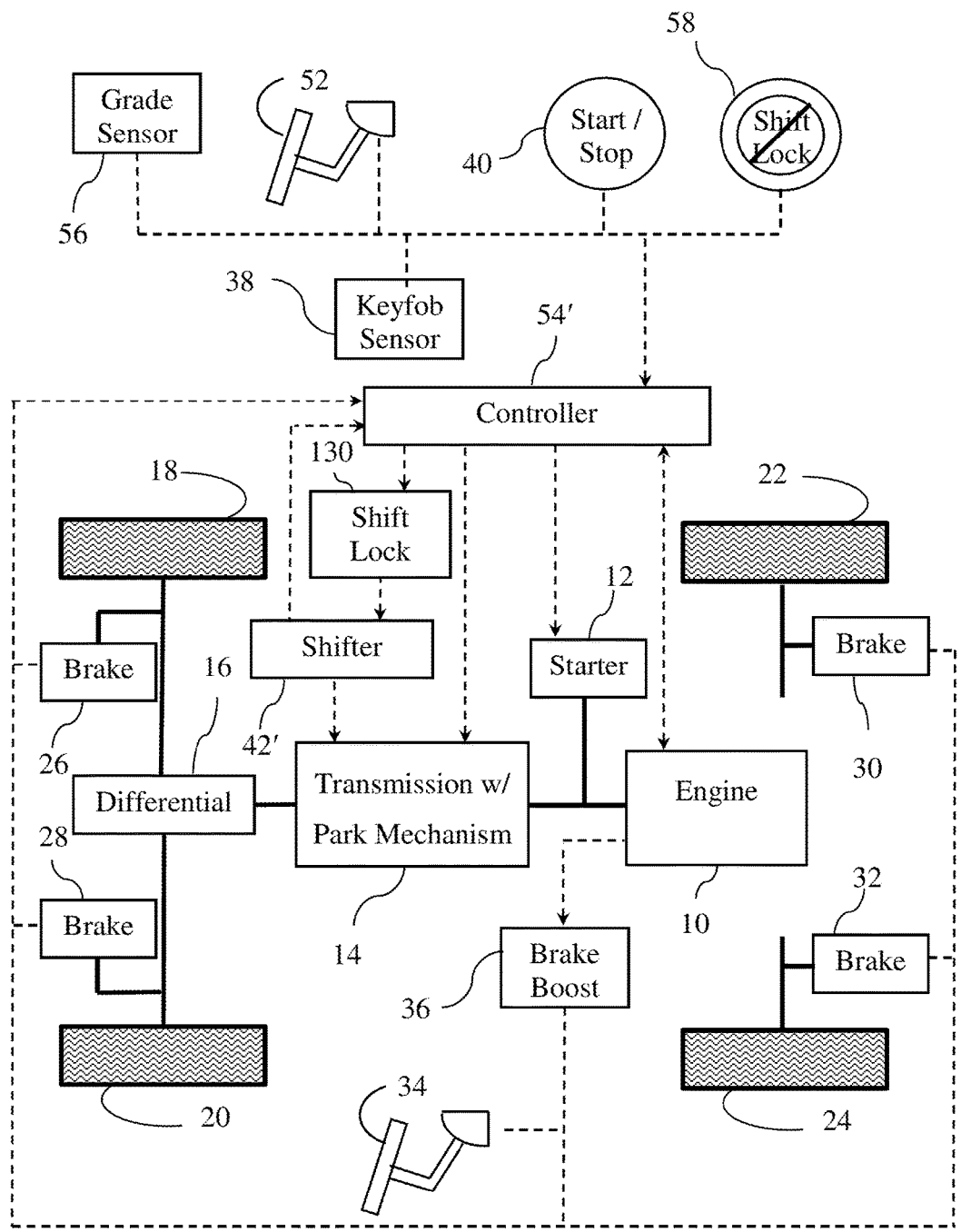
FIG. 5 is a schematic illustration of a second vehicle powertrain and user interface.

FIG. 5 illustrates an alternate rear wheel drive powertrain. Relative to the powertrain of FIG. 1, the range sensor 42 having buttons is replaced with a shifter 42' such as a console or steering wheel mounted shift lever. The shifter may be mechanically linked to the park mechanism in the transmission. Alternatively, controller 54' may read the position of the shifter and command release or engagement of the park mechanism. A mechanical shift lock 130 is engageable to hold the shifter 42' in the park position, thus preventing the driver from commanding a shift out of park. Controller 54' commands shift lock 130 to engage or disengage.

Figure 6:
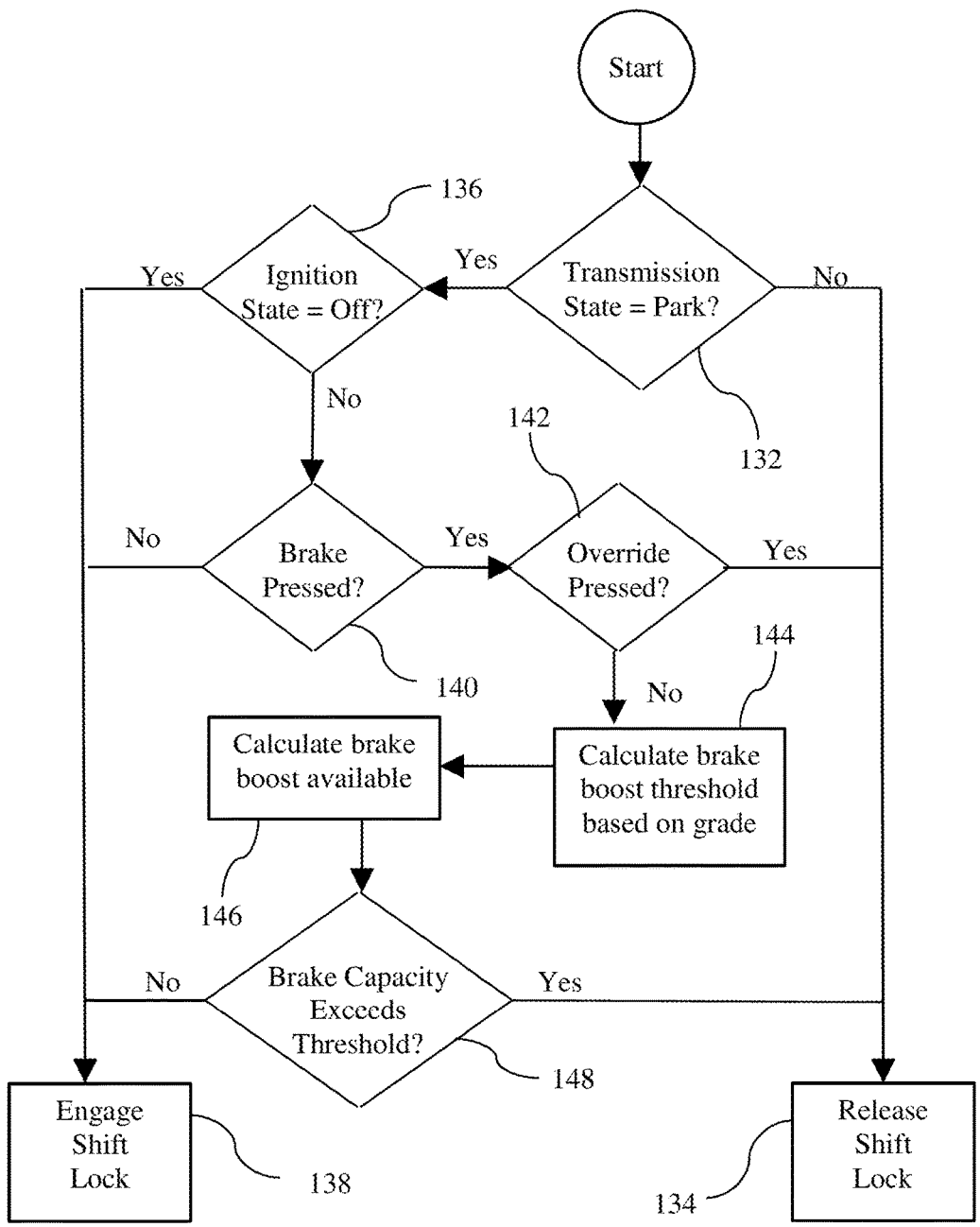
FIG. 6 is a flow chart illustrating operation of the controller of FIG. 5.

FIG. 6 illustrates exemplary control logic within controller 54' of FIG. 5 to control the state of shift lock 130. This control logic is executed at regular intervals. For example, the logic may be executed in response to an interrupt. At 132, the controller checks to see if park is currently engaged. If not, the controller commands the shift lock to the released position at 134. If the transmission state is park, the controller checks the ignition state at 136. If the ignition state is off, the controller commands the shift lock to the engaged position at 138. If the ignition state is on or accessory, the controller checks at 140 whether brake pedal 34 is pressed. If not, then the controller commands the shift lock to the engaged position at 138. If the brake pedal is pressed, the controller checks at 142 whether shift lock over-ride button 58 is pressed. If it is, then the controller commands the shift lock to the disengaged position at 134. If the over-ride button is not pressed, the controller calculates the amount of brake boost required at 144 based on the grade as sensed by grade sensor 56. This may involve a table lookup in a calibration table. The values in the table are set to ensure that a driver would be able to easily hold the vehicle on the grade. At 146, the controller determines the amount of brake boost available. This may be a direct measurement, such as a pressure in the brake system. Alternatively, a surrogate value that is closely related to brake boost available, such as engine speed, may be used. At 148, the controller decides whether to command engagement or dis-engagement by comparing the values calculated at 144 and 146.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A vehicle comprising:
    a transmission having a park mechanism;
    a transmission mode selector for accepting user requests to release or engage the park mechanism;
    an engine configured to provide brake force assistance; and
    a controller programmed to inhibit release of the park mechanism in response to a level of available brake force assistance being less than a threshold,
    wherein the threshold varies depending on road grade.

2. The vehicle of claim 1 wherein the controller inhibits release of the park mechanism in response to an ignition state indicating that the engine is not running.

3. The vehicle of claim 1 further comprising a shift lock override control and wherein the controller is programmed to release the park mechanism in response to selection of Neutral via the mode selector while the shift lock override control is activated regardless of the level of available brake force assistance.

4. The vehicle of claim 1 wherein the transmission mode selector includes buttons for selecting modes and the controller is programmed to release the park mechanism in response to depression of one of the buttons corresponding to Drive, Reverse, or Neutral only if the level of available brake force assistance exceeds the threshold.

5. The vehicle of claim 1 wherein the transmission mode selector includes a shift lock and the controller is programmed to engage the shift lock in response to the level of available brake force assistance being less than the threshold.

6. The vehicle of claim 5 further comprising a shift lock override control and wherein the controller is programmed to release the park mechanism in response to activation of the shift lock override control regardless of the level of available brake assistance.

7. The vehicle of claim 1 wherein the controller is further programmed to display a message to a driver upon inhibiting release of the park mechanism.

8. A transmission control method comprising:
    releasing a park mechanism in response to a user request if an engine is running and a brake pedal is pressed;
    preventing release of the park mechanism in response to the engine being stopped; and releasing the park mechanism in response to the user request if the engine is stopped, the brake pedal is pressed and a grade is less than a threshold.

9. The method of claim 8 further comprising:
releasing the park mechanism in response to the user request if the engine is stopped, the brake pedal is pressed and a shift lock override control is activated.

10. The method of claim 8 further comprising:
displaying a message to a driver in response to an attempt to disengage the park mechanism with the engine stopped.

11. A transmission control method comprising:
measuring a quantity indicative of available brake boost; and
preventing release of a park mechanism in response to the quantity being less than a threshold,
wherein the threshold varies based on grade.

12. The method of claim 11 wherein release of the park mechanism is prevented by engaging a shift lock.

13. The method of claim 11 wherein the quantity is engine speed.

* * * * *